Figure 3:
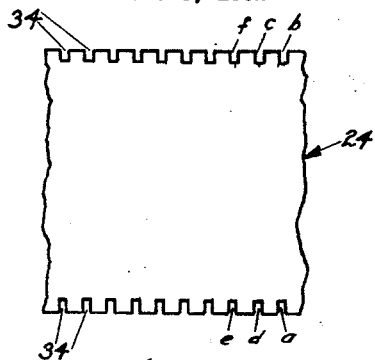

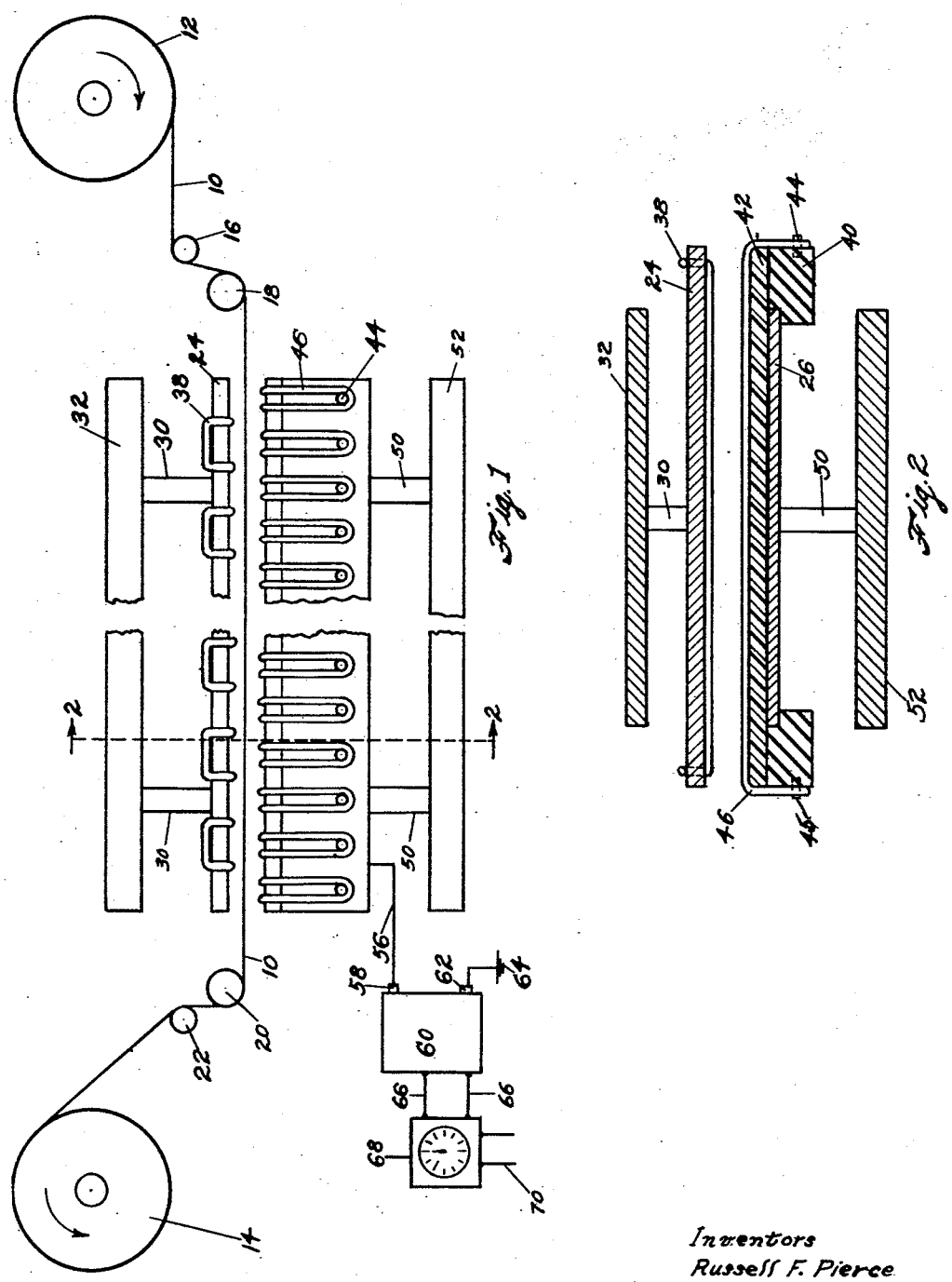

Oct. 29, 1957  R. F. PIERCE ET AL  2,810,933
APPARATUS FOR AND METHOD OF TREATING PLASTIC FILM
Filed Feb. 9, 1952  2 Sheets-Sheet 2

Inventors
Russell F. Pierce
Vernie G. Potter
By Harry M. Levin
Attorney

United States Patent Office 2,810,933
Patented Oct. 29, 1957

2,810,933

APPARATUS FOR AND METHOD OF TREATING PLASTIC FILM

Russell F. Pierce and Vernie G. Potter, Terre Haute, Ind., assignors, by mesne assignments, to Union Carbide Corporation, a corporation of New York Application February 9, 1952, Serial No. 270,872

8 Claims. (Cl. 18—48)

This invention relates to improving the adhesion of surfaces of plastic film to printing inks. More particularly, it relates to an apparatus for and method of simultaneously treating opposite surfaces of plastic film to improve the adhesion thereof to printing inks whereby when the treated surfaces are imprinted the dried imprints will adhere firmly and tenaciously.

Polyethylene film, in the form of tubing or sheeting, irrespective of the method of production, is admirably suited for use as a wrapping or packaging material. A packaging or wrapping material, in order to obtain extensive and widespread use, must be of a type and nature so that various indicia, particularly trademarks, advertising indicia, recipes, etc., can be imprinted thereon by the usual printing processes and the dried imprints must adhere firmly and effectively resist removal upon abrasion and other treatments to which the printed film would be subjected during its life, i. e., from the time it is printed until it reaches the consumer or user of the contents wrapped or packaged therein.

Because of the paraffin-like surface properties and the inertness of polyethylene, a film thereof can not be satisfactorily printed. When, for example, polyethylene film was imprinted with any of the known types of inks, the dried imprints did not adhere firmly to the polyethylene surface. Slight abrasion, such as gentle scraping with the back of the fingernail, removed the dried imprints with very little effort. Also, when imprinted polyethylene was subjected to the "Scotch" tape test (which has been adopted as a quick and expeditious test to ascertain the adhesion of dried imprints to the base film), substantially all of the ink constituting the imprint subjected to the test was removed. The "Scotch" tape test is performed by securing the pressure-sensitive surface of "Scotch" tape (manufactured by Minnesota Mining & Manufacturing Co.) over the dried ink imprints and thereafter rapidly stripping the tape therefrom. Satisfactory adhesion of the imprints is indicated when the stripped "Scotch" tape carries with it very little or none of the dried ink of the imprints.

An object of this invention is to provide an apparatus for and method of simultaneously treating the opposite surfaces of plastic film to improve the adhesion thereof to inks.

A specific object of this invention is to provide an apparatus for and method of simultaneously treating the opposite sides of polyethylene film to improve the adhesion thereof.

Other and additional objects of this invention will become apparent hereinafter.

The objects of this invention are accomplished, in general, by passing a plastic film through the zone of action of high voltage electric stress accompanied by corona discharge and maintaining the film so that both surfaces thereof are simultaneously subjected to the action of high voltage stress accompanied by corona discharge. The high voltage electric stress accompanied by corona discharge is produced by ionizing the gap between a pair of stationary electrodes arranged in spaced relationship. When a polyethylene film is attempted to be passed through such ionized gap the electrostatic force causes the film to be attracted to either of the electrodes and so retained thereby that the force required to break the contact will distort and, indeed, tear the film. Furthermore, that portion of the film which is in contact with the electrode is not subjected to the treatment with the result that the adhesion of such portion to printing inks is not improved. In accordance with this invention, means are provided to prevent the film from contacting the electrodes so that the film can be easily passed through the ionized gap and both surfaces of the film will be subjected simultaneously to the high voltage stress accompanied by corona discharge with the result that the adhesion of both surfaces of the film to printing inks will be materially improved.

In general, the film is prevented from contacting the electrodes by providing the opposed surfaces of the electrodes with means to maintain the film during its passage through the ionized gap in spaced relationship to the electrodes.

The means to space the film from the electrodes during passage through the gap is an insulating material having a low coefficient of friction with respect to the film being treated so that if contacted by the film the latter will slip thereover upon application of tension insufficient to distort or tear the film. The spacing means can be coextensive with the electrodes in which case it is of a porous and/or foraminous nature. Alternatively, it can be a plurality of elements arranged in spaced relationship on each of the opposed surfaces of the electrodes and preferably disposed at an angle to the path of travel of the film through the gap. The spacing means must not be deleteriously affected by high voltage stress accompanied by corona discharge or by friction with the film. Manifestly, some materials will successfully resist the high voltage stress accompanied by corona discharge and/or friction with the film longer than others. Thus, it is not intended that the spacing means permanently resist the action of high voltage stress accompanied by corona discharge and/or friction with the film. If, for example, the spacing means are after a time deleteriously affected, they can be replaced. As illustrative of materials which can be used as the spacing means in accordance with this invention are fabrics, either woven or nonwoven, which permit passage of air therethrough, such as those formed of insulating materials such as glass, cotton, wool, linen, asbestos, regenerated cellulose, etc.; cords formed of insulating materials such as glass, cotton, wool, linen, asbestos, regenerated cellulose, etc., and rods formed of ceramics, glass, refractory materials, etc. If desired, the slip of the spacing means may be improved by treating with an appropriate insulating varnish or coating composition, such as silicones.

The treatment can be effected in an operation combined with printing or in an operation combined with the production of the polyethylene structure or in an operation separate from the production or printing of the structure.

Exposure of the surface of a polyethylene structure, such as a film, to high voltage electric stress accompanied by corona discharge in accordance with this invention does not modify the desirable characteristics of the film. It does not deleteriously affect the strength, transparency, gas permeability, moistureproofness, waterproofness or chemical inertness of the original structure. Precisely what occurs in or on the surface of the film is at present not understood. However, when the treated surface is imprinted, the imprints adhere so tenaciously that very little or none of the ink is removed by the "Scotch" tape test. Moreover, the adhesion of such imprints to the surface is substantially unaffected upon contact with fats or fatty materials for an appreciable length of time, such as for at least two days.

The improvement in ink adhesion is not restricted to any specific ink or particular class of inks. In general, imprints of any type of printing ink, such as, for example, aniline inks, intaglio inks and drying oil inks adhere satisfactorily to the treated surfaces.

Figure 4:
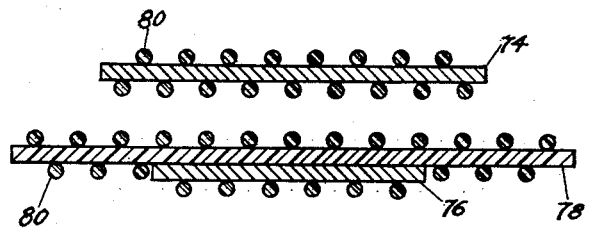
Figure 5:
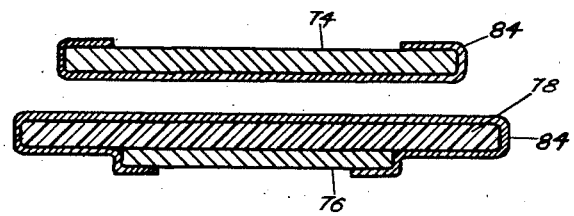

The invention will be more clearly understood by reference to the following detailed description when taken in conjunction with the accompanying drawings forming a part of this specification and in which, Figure 1 is a front elevation, partly diagrammatic, of one embodiment of an apparatus for simultaneously treating both sides of polyethylene film in accordance with this invention, Figure 2 is a section taken on lines 2—2 of Figure 1 with the film omitted, Figure 3 is a broken fragmentary plan view of one of the electrodes shown in Figure 1 and with the spacing means omitted, Figure 4 is a section of a modified electrode assembly, and Figure 5 is a cross section of another modified electrode assembly.

Referring now to the drawings wherein like reference numerals designate like parts, the reference numeral 10 designates a self-sustaining polyethylene film which is unwound from a supply roll 12 and is caused to pass through the ionized air gap of the electrode assembly hereinafter more fully described. After passage through the gap the film is wound up on a reel 14 which is positively driven and is provided with means, such as a torque motor drive, whereby the peripheral speed of the wind-on surface will remain constant. The means for driving reel 14 and the means for maintaining the peripheral speed of the wind-on surface constant are well known and since the specific details thereof form no part of this invention, further description thereof is deemed unnecessary.

In the form shown in Figure 1, film 10, after unwinding from the roll 12, passes over roll 16 and under roll 18 prior to entering the gap of the electrode assembly. After passing through the gap of the electrode assembly, film 10 passes beneath roll 20 and over roll 22 prior to winding on reel 14. Rolls 16, 18, 20 and 22 can be idlers or positively driven. When positively driven, the peripheral speeds thereof are the same as, or slightly less than, the peripheral speed of the wind-on surface of reel 14 so that the film will be taut but not subjected to any undue tension during the treatment. Rolls 18 and 20 are positioned so that the film will be directed through the longitudinal center axis of the air gap.

The means for producing the high voltage electric stress accompanied by corona discharge comprises a pair of stationary parallel electrodes 24 and 26 disposed in uniformly spaced relationship with respect to each other. Electrode 24, constituting the ground electrode, is carried on a pair of posts 30 which, in turn, are appropriately secured to any suitable support generally indicated in the drawings by the reference character 32. In the form shown in Figures 1, 2 and 3, ground electrode 24 is provided with spaced notches 34 adjacent each of its longitudinal edges, and a glass cord 38 is threaded therethrough and held in position thereby as will now be explained. The cord passes through notch a, thence over the surface of the electrode exposed to the air gap to notch b at the opposite edge, thence to notch c and thence over the surface of the electrode exposed to the air gap to notch d, thence to notch e, and so continued until over the length of the electrode. As shown in Figure 1, the sections of cord 38 passing from one notch to an adjacent notch lie on the outer surface of electrode 24. The sections of cord 38 on the surface of electrode 24 exposed to the gap are spaced relative to each other and are at right angles to the path of travel of the film through the gap.

Electrode 26 constituting the high voltage electrode is disposed and appropriately secured in a recess formed in the inner periphery of a frame 40 formed of an insulating material. A solid dielectric 42 coextensive with the outer dimensions of frame 40 is disposed on electrode 26 and frame 40. The front and rear members of the frame 40 are provided with spaced insulating pins 44 and 45 as shown in Figures 1 and 2. A glass cord 46, as shown in Figures 1 and 2, passes beneath a pin 44 up and over the surface of dielectric 42 exposed to the gap and thence downwardly and under pin 45 on the opposite side of the frame, thence upwardly and over the surface of the dielectric exposed to the gap to next pin 44, etc. In other words, cord 46 passes alternately under pins 44 and 45 and sections thereon lie on the surface of the dielectric exposed to the gap. By this construction the sections of cord 46 on the surface of dielectric 42 exposed to the gap are in spaced relationship and are at an angle to the path of travel of the film through the gap. High voltage electrode 26 is mounted on insulating posts 50 which, in turn, are carried on any suitable support, generally indicated by the reference numeral 52 in the drawings.

The sections of spacing cord 38 extending over the surface of electrode 24 exposed to the gap may be disposed in vertical alignment, staggered, or otherwise suitably disposed with respect to the sections of cord 46 extending over the surface of dielectric 42 exposed to the gap.

High voltage electrode 26 is electrically connected by a lead 56 to one of the terminals 58 of the secondary of a high voltage transformer 60. The other terminal 62 of the secondary of the high voltage transformer 60 is appropriately connected to ground 64 common to electrical systems. It is to be noted that ground electrode 24 is electrically connected to ground 64 in any suitable manner.

The primary of the high voltage transformer 60 is connected by leads 66 to a variable voltage transformer 68 which, in turn, is connected by leads 70 to a suitable source of electrical power.

High voltage transformer 60 is of the high leakage reactance type, commonly known as a neon transformer, and capable of giving from 10,000 to 30,000 volts at approximately 5 to 40 milliamperes A. C. at line frequency to electrodes 24 and 26. Variable transformer 68 is of the known type capable of delivering from 0 to 135 volts at line frequency.

Referring now to Figure 4 wherein another embodiment of the invention utilizing glass cord is shown, the reference numeral 76 designates a high voltage electrode on which there is disposed a dielectric 78 of greater dimensions than the high voltage electrode 76 in order to prevent arcing. A glass cord 80 is spirally wound on electrode 74 and a second cord 80 is spirally wound on the high voltage electrode 76 and dielectric 78. On each electrode the windings are spaced from each other and the windings on one electrode may be in alignment with, staggered, or otherwise suitably disposed relative to the windings on the other electrode. As will be apparent, in this construction the opposed surfaces of the electrode assembly exposed to the gap are provided with sections of glass cord disposed at an angle to the path of travel of the film through the gap.

Instead of using glass cord as the means for spacing the film passing through the ionized gap of the electrode assembly from the electrodes, a fabric 84, such as a cellulose bonded nonwoven web of cotton or rayon may be disposed on each of the electrodes as shown in Figure 5. The portion of the fabric extending beyond the edges of each of the electrodes is folded onto the rear surface thereof and secured thereto in any convenient manner.

In general, the length and width of the ground electrode of the system are greater than the length and width of the high voltage electrode.

The width of the high voltage electrode is such as to permit the application of the high voltage electric stress accompanied by corona discharge over a part of or the entire width of the exposed surfaces of the film. Usually, the width of the high voltage electrode is approximately the same as or greater than the width of the film area subjected to the treatment.

The length of the high voltage electrode in any selected system depends on the speed of travel of the film through the field of high voltage stress accompanied by corona discharge. Thus, the greater the speed of travel of the film the longer the electrode, and the slower the speed the shorter the electrode. The electric power delivered to the selected electrode system depends on the area of the high voltage electrode. Thus, with a delivered voltage, a high voltage electrode of greater area will deliver a higher current than an electrode having a smaller area. In practice, satisfactory results have been obtained when a voltage of from 10,000 to 20,000 is applied to the electrode system, it, of course, being understood that with any voltage used the other conditions necessary to effect the desired film treatment will be correlated.

The electrodes can be made of any electrically conductive material. Electrodes of stainless steel have given satisfactory results.

The height (thickness) of the air gap of the electrode system is such that in cooperation with the solid dielectric an application of voltage sufficiently high to produce corona discharge without arcing is obtained, and also provides sufficient clearance to permit the spacing means and the film to pass therethrough. Thus, for example, with polyethylene film up to ten thousandths of an inch in thickness the air gap may be of a height up to approximately one-half inch, though satisfactory results have been obtained when such air gap was approximately a quarter of an inch.

Preferably, the thickness of the solid dielectric is such as will not fail by arcing through during operation. Such thickness may be determined by empirical experiments wherein the minimum thickness of the dielectric satisfactory for use is determined. For example, when polyethylene constitutes the solid dielectric the minimum thickness is 0.005 inch, but in practice it can be of a thickness up to approximately 0.05 inch.

Though polyethylene when used as a solid dielectric gives satisfactory results, it is to be understood that the invention is not restricted thereto. Any dielectric material such as thermoplastics, ceramics, glass and mica permitting the application of high voltage electric stress accompanied by corona discharge without arcing may be used.

Though in the specific embodiments previously described the solid dielectric is disposed on the high voltage electrode, the invention is not restricted thereto. The solid dielectric may be disposed on the ground electrode alone or on both of the electrodes.

In those embodiments of the invention wherein an insulating cord or rod is used, the sections thereof exposed to the gap are disposed at an angle to the path of travel of the film through the gap of the system so that in the event the film contacts any of such spacers the area of contact will be relatively small and the film will more easily slip thereover. The sections of the cord can be disposed at any angle up to 90 degrees to the path of travel of the film through the gap.

The diameter of the cord or rod depends on the size (height) of the gap and for any particular gap the optimum diameter can be determined by simple empirical tests. The same is true as to the spacing of such spacing elements. In a system wherein the height (thickness) of the gap is 0.30 inch, satisfactory results were obtained with a glass tying cord one-sixteenth of an inch in diameter and the sections thereof exposed to the gap are spaced at approximately one-quarter inch intervals.

It is to be understood that the disposition and securing of the spacing elements hereinbefore described are merely illustrative and that any other appropriate means for securing the spacing means in position can be used.

If desired, spacing elements comprising both cords or rods and fabrics may be used. Thus, for example, a fabric such as Viskon nonwoven fabric, in which the bonding agent is regenerated cellulose, may be disposed on the electrodes beneath or over the glass cord. Alternatively, the spacing means on one of the electrodes may be cord and fabric on the other.

The apparatus and method of this invention can be used in conjunction with the production of the film. In such case, the electrode assembly is positioned prior to the wind-up and the final film will have improved adhesion to printing inks. In another embodiment, the electrode assembly can be positioned before the printing machine whereby the film, after it is supplied from the source of supply and before it is imprinted, is passed through the zone of action of the electrode assembly.

The period of time required for the treatment of a film to improve ink adhesion thereon is relatively small. In general, the longer the treatment the better the adhesion. For example, good ink adhesion was obtained when a 12" wide polyethylene film 1½ mil thick was passed through the ionized gap of the following system at approximately forty feet per minute:

(1) High voltage stainless steel electrode 15" wide x 18" long x ⅛" thick.

(2) Mica dielectric on high voltage electrode 24" wide x 30" long x .05" thick.

(3) Stainless steel ground electrode 18" wide x 30" long x ⅛" thick.

(4) Air gap between high voltage electrode assembly and ground electrode 0.30".

(5) Glass tying cord $\frac{1}{16}$" in diameter and spaced at ¼" intervals on the surfaces exposed to gap and at an angle of 90° relative to path of travel of film through gap.

(6) Secondary amperage of high voltage transformer is 12 ma.

(7) Primary voltage of high voltage transformer is 96 v. A. C.

Satisfactory ink adhesion was also obtained when a 40" wide polyethylene film 1½ mil thick was passed through the ionized gap of the following system at forty feet per minute:

(1) High voltage stainless steel electrode 3" long x 60" wide x ⅛" thick.

(2) Mica dielectric on high voltage electrode 12" long x 72" wide x .05" thick.

(3) Stainless steel ground electrode 12" long x 72" wide x ⅛" thick.

(4) Air gap between high voltage electrode assembly and ground electrode 0.30".

(5) Glass tying cord $\frac{1}{16}$" in diameter and spaced at ¼" intervals on the surfaces exposed to gap and at an angle of 90° relative to path of travel of film through gap.

(6) Secondary amperage of high voltage transformer is 20 ma.

(7) Primary voltage of high voltage transformer is 111 v. A. C.

In the examples and claims the term "electrode" covers an electrode per se or an electrode provided with an insulating dielectric thereon.

The improved ink adhesion obtained by imprinting the surface of polyethylene film treated as hereinbefore described is not limited to the use of any specific printing inks. Film treated as herein described and imprinted with, for example, aniline inks, intaglio inks, drying oil inks, etc., successfully pass the "Scotch" tape test and the adhesion of the imprints are not appreciable if, indeed, at all affected by contact with fats.

The invention is particularly applicable for improving ink adhesion on self-supporting polyethylene film. It is also applicable to self-supporting films formed of other plastics, such as Saran (vinylidene chloride copolymer), rubber hydrochloride vinyl acetate, vinyl chloride copolymers, vinyl modified butadiene acrylonitrile copolymers, etc. The invention provides a simple and economic method of simultaneously treating both surfaces of plastic film to improve the adhesion thereof to printing inks.

Since it is obvious that various changes and modifications may be made in the above description without departing from the nature or spirit thereof, this invention is not restricted thereto except as set forth in the appended claims.

We claim:

1. An apparatus for treating plastic film to improve the adhesion thereof to ink impressions subsequently imprinted thereon comprising a pair of stationary electrodes disposed in parallel spaced relationship to provide a gap therebetween, means to produce high voltage stress accompanied by corona discharge in said gap, means to pass a film through said gap, and means on each of the opposed surfaces of the electrodes to space said film during passage through said gap from said electrodes whereby the directly opposite surfaces of the film are simultaneously exposed and subjected to said high voltage stress accompanied by corona discharge upon passage through said gap.

2. An apparatus as set forth in claim 1 wherein the means to space the film during passage through the gap comprises a plurality of insulating rods disposed in spaced relation on each of the opposed surfaces of the electrodes, each rod being at an angle to the path of travel of the film and extending from one edge to the opposite edge of the respective electrode.

3. An apparatus as set forth in claim 1 wherein the means to space the film during passage through the gap comprises cloth formed of insulating material disposed on and at least coextensive with each of the opposed surfaces of the electrodes.

4. An apparatus as set forth in claim 1 wherein the means to space the film during passage through the gap comprises a plurality of insulating cord sections disposed in spaced relationship on each of the opposed surfaces of the electrodes, each cord section being at an angle to the path of travel of the film and extending from one edge to the opposite edge of the respective electrode.

5. An apparatus as set forth in claim 1 wherein the means to space the film during passage through the gap comprises an insulating cord spirally wound about each electrode, the windings being spaced relative to each other and extending at an angle to the path of travel of the film.

6. An apparatus as set forth in claim 1 wherein one of the electrodes has spaced notches at the front and rear edges thereof and an insulating cord laced over the surface exposed to the gap and through the notches.

7. An apparatus as set forth in claim 1 wherein one of the electrodes is disposed in a frame, a dielectric sheet material is disposed on said frame and electrode, said frame having a plurality of spaced pins in the front and rear edges, and an insulating cord alternately passing beneath a pin on one edge to beneath a pin on the other edges whereby the exposed surface of said dielectric material is provided with a plurality of insulating cord sections in spaced relationship and at an angle to the path of travel of the film.

8. An apparatus for treating plastic film to improve the adhesion thereof to ink impressions subsequently imprinted thereon comprising a pair of electrodes disposed in spaced relationship to provide a gap therebetween, means to produce high voltage stress accompanied by corona discharge in said gap, means to pass a plastic film through said gap, and means on each of the opposed surfaces of the electrodes to space said film during passage through said gap from said electrodes whereby both surfaces of the film are simultaneously exposed and subjected to said high voltage stress accompanied by corona discharge.

References Cited in the file of this patent

UNITED STATES PATENTS

| | | |
|---|---|---|
| 1,352,699 | Smith | Sept. 14, 1920 |
| 1,832,096 | Chafee et al. | Nov. 17, 1931 |
| 1,872,302 | Knowles | Aug. 16, 1932 |
| 1,878,318 | Pinder | Sept. 20, 1932 |
| 1,927,381 | Allen et al. | Sept. 19, 1933 |
| 2,483,462 | Huebner | Oct. 4, 1949 |
| 2,551,035 | Miller | May 1, 1951 |
| 2,551,582 | Carlson | May 8, 1951 |